(12) United States Patent
Sekai (10) Patent No.: US 7,608,943 B2
(45) Date of Patent: Oct. 27, 2009

(54) POWER SUPPLY ADAPTER AND POWER SUPPLY SYSTEM

(75) Inventor: Koji Sekai, Kanagawa (JP)

(73) Assignee: Sony Corporation, Tokyo (JP)

( * ) Notice: Subject to any disclaimer, the term of this patent is extended or adjusted under 35 U.S.C. 154(b) by 84 days.

(21) Appl. No.: 10/876,292

(22) Filed: Jun. 24, 2004

(65) Prior Publication Data

US 2005/0007063 A1 Jan. 13, 2005

(30) Foreign Application Priority Data

Jul. 3, 2003 (JP) ............... 2003-191358

(51) Int. Cl.
*H02J 9/04* (2006.01)
*H01H 83/00* (2006.01)

(52) U.S. Cl. ............... 307/64; 361/600; 361/601; 361/641; 361/643

(58) Field of Classification Search .......... 307/64–66; 361/600–601, 641, 643
See application file for complete search history.

(56) References Cited

U.S. PATENT DOCUMENTS

| | | | | |
|---|---|---|---|---|
| 3,823,358 A * | 7/1974 | Rey | .................... | 320/101 |
| 4,251,736 A * | 2/1981 | Coleman | ................... | 307/46 |
| 4,775,800 A * | 10/1988 | Wood | ................... | 307/46 |
| 5,612,580 A * | 3/1997 | Janonis et al. | ............ | 307/64 |
| 6,011,324 A * | 1/2000 | Kohlstruck et al. | ...... | 307/64 |
| 6,259,971 B1 * | 7/2001 | Mitchell et al. | ............ | 700/286 |
| 6,268,077 B1 * | 7/2001 | Kelley et al. | .............. | 429/33 |
| 6,503,649 B1 * | 1/2003 | Czajkowski et al. | ..... | 429/23 |
| 6,602,627 B2 * | 8/2003 | Liu et al. | .................... | 429/23 |
| 6,630,750 B2 * | 10/2003 | McAndrews | ............. | 307/64 |
| 6,649,298 B2 * | 11/2003 | Hayashi et al. | ........... | 429/34 |
| 6,653,749 B2 * | 11/2003 | Delbridge | ................. | 307/85 |
| 6,746,790 B2 * | 6/2004 | Colborn | ................. | 429/26 |
| 6,757,590 B2 * | 6/2004 | Ross et al. | ............... | 700/286 |
| 6,887,596 B2 * | 5/2005 | Leban | ..................... | 429/9 |
| 7,087,327 B2 * | 8/2006 | Pearson | ................. | 429/12 |
| 7,124,310 B2 * | 10/2006 | Hayashi et al. | ........... | 713/320 |
| 7,307,360 B2 * | 12/2007 | Gonzales et al. | .......... | 307/64 |
| 7,388,304 B2 * | 6/2008 | Bitoh | ..................... | 307/64 |
| 7,485,990 B2 * | 2/2009 | Ozeki et al. | .............. | 307/150 |
| 2004/0053082 A1 * | 3/2004 | McCluskey et al. | ...... | 429/9 |
| 2007/0275271 A1 * | 11/2007 | Lee | ........................ | 429/9 |
| 2008/0007200 A1 * | 1/2008 | Minamiura et al. | ....... | 320/102 |
| 2008/0044717 A1 * | 2/2008 | Chou et al. | ............... | 429/38 |

FOREIGN PATENT DOCUMENTS

| | | |
|---|---|---|
| JP | 05-184065 | 7/1993 |
| JP | 08-227330 | 9/1996 |
| JP | 09-213359 | 8/1997 |
| JP | 10-285822 | 10/1998 |

(Continued)

*Primary Examiner*—Stephen W Jackson
*Assistant Examiner*—Adi Amrany
(74) *Attorney, Agent, or Firm*—Robert J. Depke; Rockey, Depke & Lyons, LLC (57) ABSTRACT

Electronic devices are intended to be small-sized and lightweight. A fuel cell 54 is provided for a power supply adapter 3. Power generated by the fuel cell 54 can be supplied to an electronic device 2. Accordingly, the electronic device 2 can be made more compact and lightweight than a conventional electronic device mounted with a fuel cell as a power supply source.

13 Claims, 5 Drawing Sheets

FOREIGN PATENT DOCUMENTS

| | | |
|---|---|---|
| JP | 11-313444 | 11/1999 |
| JP | 2001-006717 | 1/2001 |
| JP | 2002-032154 | 1/2002 |
| JP | 2002-049440 | 2/2002 |
| JP | 2002-161997 | 6/2002 |
| JP | 2002-280044 | 9/2002 |
| JP | 2003-142137 | 5/2003 |

\* cited by examiner

POWER SUPPLY ADAPTER AND POWER SUPPLY SYSTEM

BACKGROUND OF THE INVENTION

1. Field of the Invention

The present invention relates to a power supply adapter and a power supply system to supply electric power to an electronic device and/or to a secondary battery mounted on the electronic device.

This application claims priority of Japanese Patent Application No. 2003-191358, filed on Jul. 3, 2003, the entirety of which is incorporated by reference herein.

2. Description of the Related Art

In recent years, portable electronic devices are spreading such as notebook personal computers, portable cellular phones, camera-mounted VTRs (Video Tape Recorders), and PDAs (Personal Digital Assistants). These portable electronic devices are mounted with secondary batteries such as lithium ion secondary batteries and nickel hydride secondary batteries. These batteries feature light weight and high energy density, and are capable of charge and discharge. The electronic devices operate using these secondary batteries as drive power supplies.

When the secondary battery power is used up completely, the portable electronic devices are supplied with drive power from an external power supply, for example, via power supply adapters such as AC adapters and the like. When supplied from the external power supply via power supply adapters and the like, the electric power directly drives a portable electronic device or charges a secondary battery mounted in the device. Accordingly, portable electronic devices become unusable when the secondary batteries are completely consumed at a place where there is not available an external power supply, i.e., a power receptacle capable of supplying power.

A solution to this problem is, for example, a fuel cell that can generate power by means of electrochemical reaction where no power receptacle is available. Specifically, there are available personal computers and the like mounted with fuel cells (Jpn. Pat. Appln. Laid-Open Publication No. 2002-49440).

Example fuel cells include PEFC (Polymer Electrolyte Fuel Cell), DMFC (Direct Methanol Fuel Cell), and the like. To generate power, these fuel cells use hydrogen, alcoholic substances, and the like as fuel, oxidize the fuel at cathodes, and deoxidize oxygen and the like in the air and the like at anodes.

If a portable electronic device is equipped with the fuel cell as a drive power supply, however, an inlet needs to be provided to take the fuel for power generation into the cell. Further, pipe laying is needed to circulate the fuel in the cell. Moreover, an outlet or the like needs to be provided to exhaust carbon dioxide, water, vapor, and the like because these are generated as reaction products after power generation due to the electrochemical reaction. When chemical compounds such as hydrocarbon and the like are used as the fuel, a reformer or the like is needed to reform the chemical compound so as to generate hydrogen from the chemical compound.

When the portable electronic device uses a fuel cell as the drive power supply, it is difficult to make the portable electronic device small and lightweight.

Further, when the portable electronic device uses a fuel cell as the drive power supply, the fuel cell generates much heat due to power generation according to the electrochemical reaction. The portable electronic device may malfunction due to heat generated from the fuel cell.

SUMMARY OF THE INVENTION

The present invention has been made in consideration of the foregoing. It is therefore an object of the present invention to provide a power supply adapter and a power supply system which prevent electronic devices supplied with power by fuel cells from becoming large-sized and prevent electronic devices from malfunctioning due to heat generated from fuel cells after power generation.

To achieve the above-mentioned objects, a power supply adapter according to the present invention supplies power from an external power supply to an electronic device and/or a secondary battery mounded on the electronic device. The power supply adapter comprises: a fuel cell to generate power based on electrochemical reaction; a control means for providing selection control so that the electronic device and/or the secondary battery is supplied with any of power from the external power supply and power generated by the fuel cell; and an adapter body to mount the fuel cell and the control means, wherein the control means provides control to drive the fuel cell and supply power generated by the fuel cell to the electronic device and/or the secondary battery when power supplied from the external power supply becomes insufficient or unavailable.

Further, a power supply system according to the present invention comprises: an electronic device and/or a secondary battery mounted on the electronic device; and a power supply adapter to supply power from an external power supply to the electronic device and/or the secondary battery, wherein the power supply adapter comprises: a fuel cell to generate power based on an electrochemical reaction; and a control means for providing selection control so that the electronic device and/or the secondary battery is supplied with any of power from the external power supply and power generated by the fuel cell; and wherein the control means provides control to drive the fuel cell and supply power generated by the fuel cell to the electronic device and/or the secondary battery when power supplied from the external power supply becomes insufficient or unavailable.

According to the present invention, the power supply adapter is provided with the fuel cell. The electronic device can be supplied with the power generated by the fuel cell from the outside. Accordingly, the electronic device can be more small-sized than an electronic device mounted with a fuel cell. It is possible to prevent the electronic device from being affected by heat generation resulting from the power generation by the fuel cell.

Since the present invention provides the power supply adapter with the fuel cell, power generated by the fuel cell can drive the electronic device and/or charge the secondary battery even if no power is supplied from an external power supply, i.e., when no power receptacle is available.

As clearly understood from the above-mentioned description, the present invention provides the fuel cell for the power supply adapter. The electronic device and the like can be supplied with power generated by the fuel cell. The electronic device can be smaller and more lightweight than electronic devices mounted with fuel cells as power supply sources.

Since the present invention provides the power supply adapter with the fuel cell, it is possible to prevent the electronic device from being affected by heat generation resulting from the power generation by the fuel cell.

Since the present invention provides the power supply adapter with the fuel cell, power generated from the fuel cell

DETAILED DESCRIPTION OF THE PREFERRED EMBODIMENTS

Figure 1:
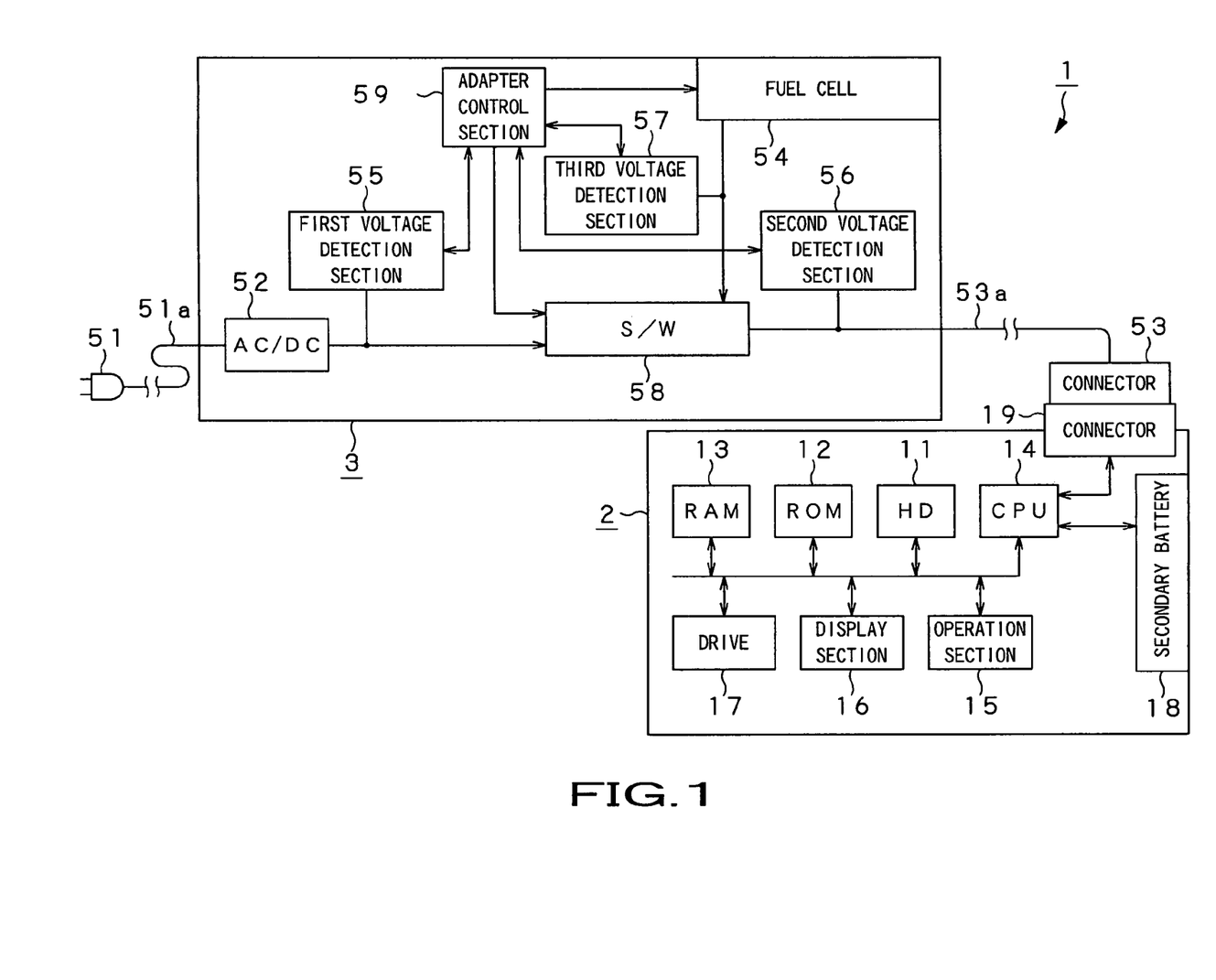
FIG. 1 schematically shows a configuration of a power supply system according to the present invention.

The following describes the power supply adapter and the power supply system according to the present invention with reference to a power supply system 1 for electronic devices in FIG. 1. The power supply system 1 for electronic devices comprises an electronic device 2 and a power supply adapter 3. The electronic device 2 is lightweight and small-sized and can be carried by users. The power supply adapter 3 is an external power supply for the electronic device 2 and supplies power from a power receptacle capable of supplying power.

The electronic device 2 represents information processing equipment such as notebook personal computers, portable cellular phones, camera-mounted VTRs, and PDAs, for example.

For example, the electronic device 2 comprises a hard disk (acronymed HD hereafter) 11, read only memory (acronymed ROM hereafter) 12, random access memory (acronymed RAM hereafter) 13, a central processing unit (acronymed CPU hereafter) 14, an input operation section 15, a display section 16, and a drive 17. The HD 11 forms a storage section that stores various application programs for driving the electronic device 2 according to uses. The ROM 12 stores a control program that controls overall operations. The RAM 13 is used to load programs stored in the HD 11 and ROM 12. The CPU 14 controls operations of the entire device based on a program loaded into the RAM 13. The input operation section 15 comprises a keyboard, a mouse, a touch panel, and the like for input operations. The display section 16 displays information and the like based on application programs and the like stored in the HD 11. The drive 17 is used to mount external storages such as optical disks, magnetic optical disks, magnetic disks, IC cards, tape cassettes, disk cartridges, and the like. In addition, the electronic device 2 comprises a secondary battery 18 and a connector 19. The secondary battery 18 functions as a drive power supply for the device. The connector 19 is used as an inlet of the power from the outside to the device.

A user of the electronic device 2 configured as mentioned above enters a command from the input operation section 15 to start the control program stored in the ROM 12. The CPU 14 then reads necessary programs from the HD 11 and the ROM 12 and executes the programs. Specifically, to charge the secondary battery 18 in the electronic device 2, a user enters an instruction for charging from the input operation section 15. The CPU 14 executes a control program stored in the HD 11 or the ROM 12 to provide control for charging the secondary battery 18 with the power supplied via the connector 19.

Figure 2:
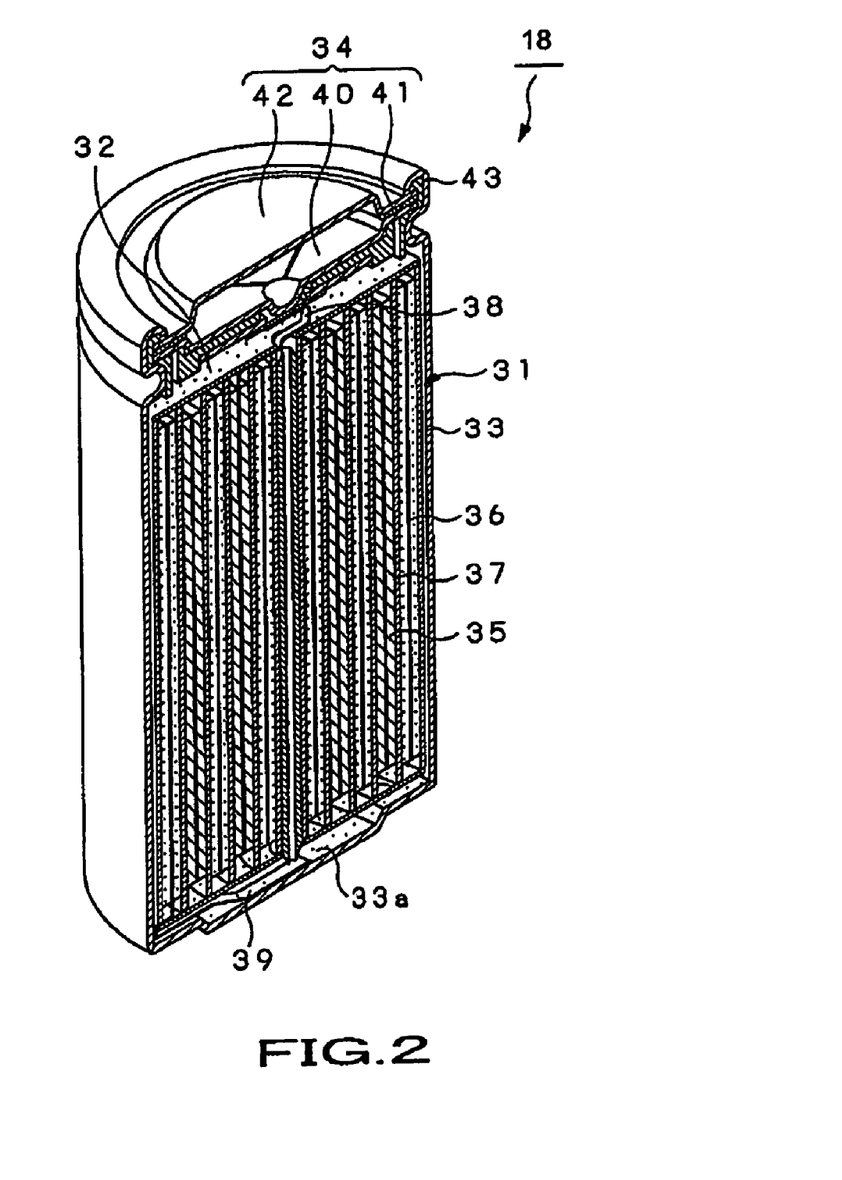
FIG. 2 is a perspective view showing an internal structure of a secondary battery provided for the power supply system.

As shown in FIG. 2, the secondary battery 18 mounted on the electronic device 2 is, for example, a lithium ion secondary battery, i.e., a battery capable of charge and discharge. The secondary battery 18 supplies power to drive each section of the electronic device 2. The secondary battery 18 comprises a battery element 31 and nonaqueous electrolyte 32. The battery element 31 works as a power generation element and has a wound coil structure. The nonaqueous electrolyte 32 is used as a medium for moving lithium ions in the battery. An external case 33 is used as a container to contain the battery element 31 and the nonaqueous electrolyte 32. A sealing cap 34 covers an aperture of the external case 33.

The battery element 31 is a wound coil comprising a cathode 35 and an anode 36. The cathode 35 is belt-shaped and uses lithium transition metal complex oxide or the like as a cathode active material. The anode 36 is belt-shaped and uses a carbonaceous material as an anode active material. There is provided a belt-shaped separator 37 that prevents the cathode 35 and the anode 36 from contacting with each other. The cathode 35 and the anode 36 are layered through the intermediation of the separator 37 and are coiled several times along longer directions of the electrodes 35 and 36. Lithium ions move to and fro using the nonaqueous electrolyte 32 (to be described) as a medium between the cathode 35 and the anode 36 of the battery element 31 to cause cell reaction. A cathode lead terminal 38 comes from the cathode 35 and protrudes from one end of the battery element 31 along a winding axis. An anode lead terminal 39 comes from the anode 36 and protrudes from the other end thereof.

The nonaqueous electrolyte 32 is a solution made of electrolytic salt dissolved in nonaqueous solvent. The nonaqueous solvent comprises, for example, a cyclic carbonic acid ester compound, a cyclic carbonic acid ester compound substituting the halogen group or the halogenated acrylic group for hydrogen, a chain carbonic acid ester compound, and the like. The electrolytic salt comprises lithium salts such as $LiPF_6$, $LiClO_4$, $LiAsF_6$, $LiBF_4$, $LiB(C_6H_5)_4$, $LiCH_3SO_3$, $LiCF_3SO_3$, LiCl, LiBr, and the like.

The external case 33 is made of conductive metal, for example. The external case 33 has an approximately circular bottom 33a and constitutes a cylindrical, bottomed container. The external case 33 has an anode lead terminal 39 that is welded to the bottom 33a and is used as an anode's external terminal. For this reason, the external case 33 is made of conductive metal such as iron, stainless steel, nickel, and the like. When the external case 33 is formed of iron and the like, the surface is plated with nickel for improving rust prevention and welding reliability.

The sealing cap 34 comprises an electric current breaker 40, a PTC (Positive Temperature Coefficient) element 41, and a terminal strip 42. The electric current breaker 40 breaks the current flowing through the battery element 31 when a pressure inside the battery element 31 exceeds a specified value. When the battery element 31 is heated to too high a temperature or is subject to a flow of current exceeding a specified current value, the PTC element 41 increases an electric resistance to decrease the current flowing through the battery element 31. The terminal strip 42 is used as an external cathode terminal for the battery 12. The electric current breaker 40, the PTC element 41, and the terminal strip 42 are layered in order and are contained in a gasket 43 so as to be electrically contacted with each other. In this state, the sealing cap 34 is fixed to the aperture of the external case 33. The sealing cap 34 connects with the cathode lead terminal 38 leading to the cathode 35 and is used as a cathode's external terminal. The gasket 43 seals the battery inside while the sealing cap 34 is fixed to the aperture of the external case 33. In addition, the gasket 43 insulates the external case 33 as the anode's external terminal from the sealing cap 6 as the cathode's external terminal so that both do not contact with each other.

The secondary battery 18 having the above-mentioned configuration is detachably attached to an attachment section or the like provided on the electronic device 2. The secondary battery 18 stably supplies the electronic device 2 with the power of a specified voltage. The secondary battery 18 may be detachably mounted in a battery pack fashion on an attachment section or the like provided on the electronic device 2. That is to say, one or more secondary batteries 18 may be packaged in an external container comprising a plastic case or the like together with control circuits and the like that control voltages and currents supplied to the electronic device 2. While the secondary battery has been exemplified as a cylindrical lithium ion secondary battery, the secondary battery is not limited thereto. The secondary battery can be applied to various secondary batteries such as lithium polymer secondary batteries, nickel hydride secondary batteries, lead batteries, and the like if they are capable of charge and discharge. The secondary battery is also applicable to batteries with various shapes such as coin-type, thin, and rectangular batteries.

The connector 19 is an external terminal where a connector 53 for the power supply adapter 3 is connected. When the connector 53 of the power supply adapter 3 is connected, the connector 19 functions as a supply inlet to supply the electronic device 2 and the secondary battery 18 with the power from an external power supply and the like. The connector 19 also functions as a transmission/reception section to exchange data with external electronic devices, servers, and the like. In this case, the electronic device 2 receives control signals and the like from the outside via the connector 19 and transmits control signals and the like to the outside via the connector 19.

The electronic device 2 having the above-mentioned configuration is supplied with power from the secondary battery 18 and from the external power supply via the connector 19. The power is then supplied to respective sections of the electronic device 2. The CPU 14 provides drive control based on application programs and control programs stored in the HD 11, the ROM 12, and the like to drive the electronic device 2.

As shown in FIG. 1, the power supply adapter 3 exemplifies an AC adapter and the like to supply power to the electronic device 2 and/or secondary battery 18. The power supply adapter 3 comprises a power supply plug 51, an AC/DC conversion section 52, a connector 53, a fuel cell 54, a first voltage detection section 55, a second voltage detection section 56, a third voltage detection section 57, a selection switch 58, and an adapter control section 59. The power supply plug 51 is connected to a power receptacle as an external power supply such as an alternating current power supply for household use. The AC/DC conversion section 52 converts an alternating current for household use into a direct current with a specified voltage. The connector 53 is connected to the connector 19 for the electronic device 2. The fuel cell 54 is detachable and generates power based on the electrochemical reaction. The first voltage detection section 55 detects whether or not the power supply plug 51 is connected to the external power supply. The second voltage detection section 56 detects whether or not the connector 53 is connected to the electronic device 2. The third voltage detection section 57 detects whether or not the fuel cell 54 is attached. The selection switch 58 selects power from the external power supply or power generated by the fuel cell 54 to be supplied to the electronic device 2 and/or the secondary battery 18. The adapter control section 59 controls the other sections.

The power supply plug 51 electrically connects the power supply adapter 3 with the external power supply. The power supply plug 51 is provided with a plug-in terminal to be inserted into holes of the power receptacle as the external power supply. When the plug-in terminal is inserted into holes of the power receptacle, the power supply plug 51 supplies power from the power receptacle to the power supply adapter. The power supply plug 51 is connected to the power supply adapter 3 through a connection cord 51a. The connection cord 51a comprises metal wires that come out of the external container of the power supply adapter 3 and are coated with an insulating resin and the like.

The AC/DC conversion section 52 converts an alternating current supplied from the external power supply via the power supply plug 51 into a specified direct current. In this manner, the power supply adapter 3 becomes able to supply direct currents with a stable voltage to the electronic device 2.

The connector 53 exemplifies a terminal where the connector 19 for the electronic device 2 is connected. When connected to the connector 19 of the electronic device 2, the connector 53 functions as an inlet to supply power to the electronic device 2 and the secondary battery 18. The connector 53 also functions as an input/output terminal to input electric signals and the like to the power supply adapter 3 from the outside and to output electric signals to the outside from the power supply adapter 3. Like the power supply plug 51, the connector 53 is connected to the power supply adapter 3 through a connection cord 53a coming out of the external container of the power supply adapter 3.

Figure 3:
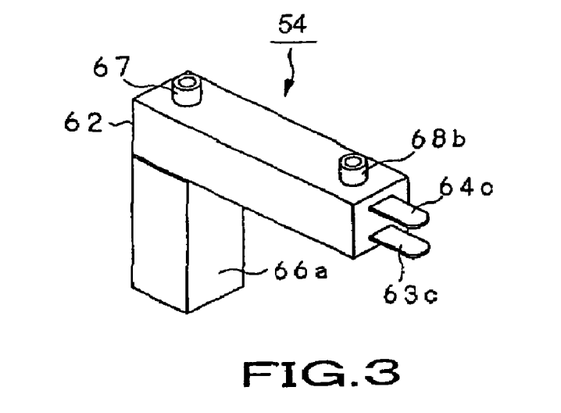
FIG. 3 is a perspective view showing a fuel cell provided for the power supply system.
Figure 4:
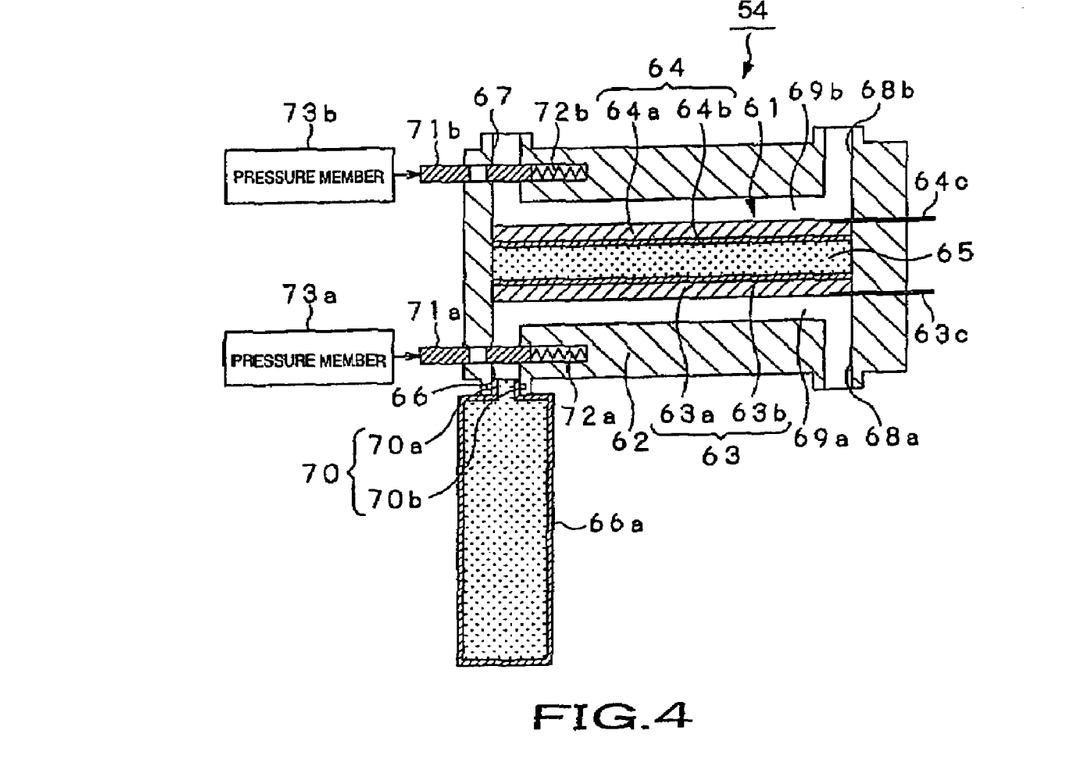
FIG. 4 is a cross sectional plan view of the fuel cell.

As shown in FIGS. 3 and 4, the fuel cell 54 comprises a power generation element 61 to generate power and an exterior part 62 used as the external container.

The power generation element 61 comprises a hydrogen electrode 63, an oxygen electrode 64, and a proton conductor 65. The hydrogen electrode 63 and the oxygen electrode 64 are fuel electrodes. The proton conductor 65 is an electrolyte membrane and is sandwiched between the hydrogen electrode 63 and the oxygen electrode 64.

The hydrogen electrode 63 comprises an electrode base 63a further comprising a fibrous carbon aggregate and a catalyst layer 63b formed on its surface. The oxygen electrode 64 comprises an electrode base 64a further comprising a fibrous carbon aggregate and a catalyst layer 64b formed on its surface. The catalyst layers 63b and 64b of the hydrogen electrode 63 and the oxygen electrode 64 can be made of, for example, platinum, platinum alloy, palladium, magnesium, titanium, manganese, lanthanum, vanadium, zirconium, nickel-lanthanum alloy, titanium-iron alloy, iridium, rhodium, and gold. It is preferable to use platinum or a platinum alloy that can accelerate the electrochemical reaction for power generation of the fuel cell 54. In the power generation element 61, an anode lead 63c comes out of the electrode base 63a of the hydrogen electrode 63. A cathode lead 64c comes out of the electrode base 64a of the oxygen electrode 64. The anode lead 63c and the cathode lead 64c are connected to the electronic device 2 via the selection switch 58 of the power supply adapter 3.

The proton conductor 65 is a membrane that prevents hydrogen gas from passing and allows protons to pass. The proton conductor 65 uses a carbonaceous material chiefly composed of carbon as a ground material into which a proton-dissociative group is introduced. The proton-dissociative group signifies a functional group in which protons can leave due to ionization. Any carbonaceous material can be used as a ground material for the proton conductor 65 if the carbonaceous material is chiefly composed of carbon. The carbonaceous material needs to ensure higher ion conductivity than electronic conductivity after the proton-dissociative group is introduced. Specifically, available carbonaceous materials as the ground material can include a carbon cluster, i.e., an aggregate of carbon atoms as well as carbonaceous materials including carbon tubes. Available carbon clusters can include, for example, fullerene, a fullerene structure at least partially having an open end, a diamond structure, and the like. It is especially desirable to select fullerene to be the carbonaceous material as the ground material of the proton conductor 65. The proton-dissociative group is introduced into the material to be used. Available proton-dissociative groups include, for example, OH group, $OSO_3H$ group, COOH group, $SO_3H$ group, and $OPO(OH)_2$ group.

The exterior part 62 comprises an attachment opening 66, an inlet 67, outlets 68a and 68b, a first flow channel 69a, and a second flow channel 69b. The attachment opening 66 is used to detachably mount a fuel cartridge filled with fuel to be supplied to the power generation element 61. The inlet 67 introduces the air into the power generation element 61. The outlets 68a and 68b exhaust a reaction product generated from the power generation. The first flow channel 69a supplies hydrogen gas to the hydrogen electrode 63. The second flow channel 69b supplies oxygen to the oxygen electrode 64. Through the attachment opening 66, the exterior part 62 introduces hydrogen gas obtained from fuel filled in a fuel cartridge 66a. The hydrogen gas flows through the first flow channel 69a and reaches the hydrogen electrode 63. The air is introduced through the inlet 67 and flows through the second flow channel 69b. Oxygen gas contained in the oxygen reaches the oxygen electrode 64. The gas flowing through the channels 69a and 69b are exhausted together with reaction products such as water from the outlets 68a and 68b connecting with the attachment opening 66 and the inlet 67, respectively. Reaction products result from the power generation.

In the exterior part 62, the attachment opening 66 is provided with a detection section 70 to detect whether or not the fuel cartridge 66a is mounted. Specifically, the detection section 70 comprises a light emitting section 70a and a light receiving section 70b that are placed opposite to each other on an inside surface of the attachment opening 66. When the light receiving section 70b detects light emitted from the light emitting section 70a, the detection section 70 determines that the fuel cartridge 66a is not attached to the attachment opening 66. When the light receiving section 70b does not detect light emitted from the light emitting section 70a, namely, when the fuel cartridge 66a blocks the light, the detection section 70 determines that the fuel cartridge 66a is attached to the attachment opening 66. The detection section 70 transmits the result as a detection signal to the adapter control section 59. The fuel cartridge 66a detachably attached to the attachment opening 66 represents a gas cylinder and the like, i.e., a container for fuel to be supplied to the hydrogen electrode 63. For example, the fuel cartridge 66a is filled with hydrogen in a gaseous or liquid state. When attached to the attachment opening 66, the fuel cartridge 66a jets out hydrogen gas toward the first flow channel 69a from the attachment opening 66.

On the exterior part 62, the inlet 67 is provided with, for example, air blasting means (not shown) comprising a fan, a blower, and the like to appropriately introduce the air into the second flow channel 69b. In this manner, the exterior part 62 can introduce the air with a specified flow volume into the second flow channel 69b from the inlet 67.

The exterior part 62 has a first movable valve 71a and a second movable valve 71b. The first movable valve 71a is provided for the first flow channel 69a. The second movable valve 71b is provided for the second flow channel 69b. On the exterior part 62, the movable valves 71a and 71b open and close the attachment opening 66 and the inlet 67. There are provided force applying members 72a and 72b comprising coil springs and the like. The force applying members 72a and 72b apply force to the movable valves 71a and 71b outward when closing the attachment opening 66 and the inlet 67. The fuel cell 54 also has pressure members 73a and 73b comprising piezoelectric devices, for example. When opening the attachment opening 66 and the inlet 67, the pressure members 73a and 73b press the movable valves 71a and 71b in a direction opposite to the force applying direction of the force applying members 72a and 72b.

When the movable valves 71a and 71b open on the fuel cell 54 having the above-mentioned configuration, the gas as fuel is supplied to the hydrogen electrode 63 and the oxygen electrode 64 through the attachment opening 66 and the inlet 67. An electrochemical reaction occurs between the hydrogen electrode 63 and the oxygen electrode 64 to start power generation. On the other hand, closing the movable valves 71a and 71b stops supplying the gas as fuel through the attachment opening 66 and the inlet 67 to stop power generation.

On the fuel cell 54, the adapter control section 59 controls opening and closing of the movable valves 71a and 71b. Specifically, the fuel cell 54 allows the adapter control section 59 to supply control signals and power to the pressure members 73a and 73b comprising piezoelectric devices. The pressure members 73a and 73b press the movable valves 71a and 71b in a direction opposite to the force applying direction of the force applying members 72a and 72b to open the attachment opening 66 and the inlet 67. This stops supplying control signals and power from the adapter control section 59 to the pressure members 73a and 73b. The pressure members 73a and 73b stop pressing the movable valves 71a and 71b to close the attachment opening 66 and the inlet 67.

While there has been described the fuel cell 54 having the power generation element 61 comprising a pair of electrodes 63 and 64, the present invention is not limited to the fuel cell having such structure. For example, the fuel cell can have a stack structure as described in Jpn. Pat. Appln. Laid-Open Publication No. 2002-50390 so that a plurality of the power generation elements 61 are layered and connected serially and/or parallel. When a plurality of power generation elements 61 are combined to provide the stack structure, the fuel cell 54 can supply the electronic device 2 and/or the secondary battery 18 with the power having specified voltage and current values.

While there has been described the fuel cartridge 66a filled with hydrogen as an example, the present invention is not limited thereto. The fuel cartridge 66a can be also filled with alcoholic substances, hydrogen absorbers, and the like such as ethanol and methanol capable of extracting hydrogen gas.

Figure 5:
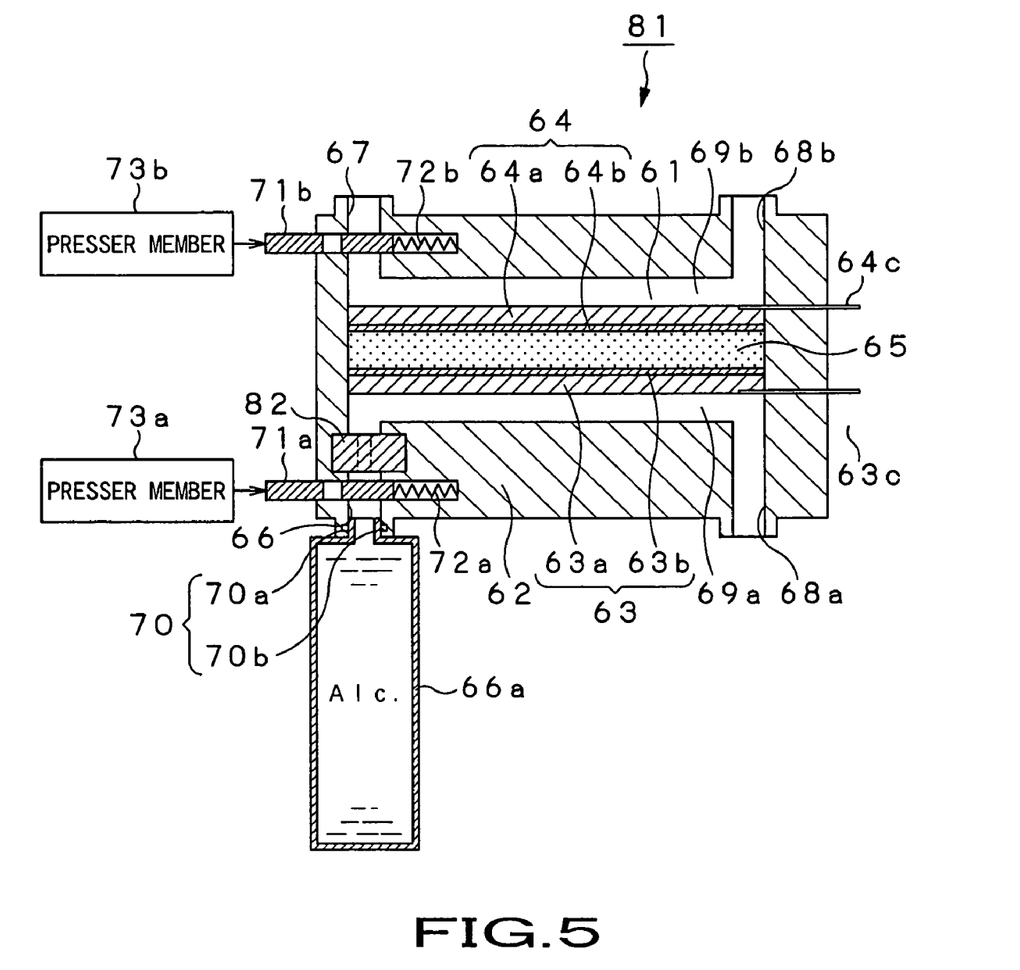
FIG. 5 is a cross sectional plan view of another example of the fuel cell.

When the fuel cartridge 66a is filled with an alcoholic substance, the fuel cell 81 requires a fuel reforming section 82 as shown in FIG. 5 between the fuel cartridge 66a and the first flow channel 69a so as to react the alcoholic substance with water and the like for reformation into hydrogen gas. The fuel reforming section 82 may be disposed on the fuel cartridge 66a. In this case, the fuel cartridge 66a reforms alcoholic substances. With respect to the fuel cell 81, the following omits the description about configurations and parts equivalent to those for the above-mentioned fuel cell 54 and uses the same reference numerals in the drawings.

When the fuel cartridge 66a is filled with a hydrogen absorber, the hydrogen absorber is exposed below a specified pressure (hydrogen desorption equilibrium pressure) to generate hydrogen gas. There is no need for means to extract hydrogen gas such as the above-mentioned fuel reforming section 82 and the like. Generally, the hydrogen desorption equilibrium pressure measures 1 atm., typically 5 to 10 atm. The hydrogen absorber uses hydrogen absorbing alloys, carbonaceous hydrogen absorbing substances, and the like. Specifically, representative hydrogen absorbing alloys include $LaNi_5$ and the like, but not limited thereto. Representative carbonaceous hydrogen absorbing substances include fullerene, carbon nanofiber, carbon nanotube, carbon soot, nanocapsule, buckyonion, carbon fiber, and the like, but not limited thereto.

As shown in FIG. 1, the first voltage detection section 55 comprises an A/D (analog/digital) converter, and the like. The first voltage detection section 55 detects a voltage for the direct current converted by the AC/DC conversion section 52. The result is converted into a digital form in the A/D converter to generate an electric signal that is then output to the adapter control section 59.

Like the first voltage detection section 55, the second voltage detection section 56 comprises an A/D converter and the like. The second voltage detection section 56 detects a voltage for the direct current flowing through the connector 53. The result is converted into a digital form in the A/D converter to generate an electric signal that is then output to the adapter control section 59.

Like the first voltage detection section 55, the third voltage detection section 57 comprises an A/D converter and the like. The third voltage detection section 57 detects a voltage resulting from the power generation by the fuel cell 54. The result is converted into a digital form in the A/D converter to generate an electric signal that is then output to the adapter control section 59.

As shown in FIG. 1, the selection switch 58 is, for example, a transistor device and the like. Based on the control signal output from the adapter control section 59, the selection switch 58 selects the connection between the power supply source and the electronic device 2 and/or the secondary battery 18. This makes it possible to supply the electronic device 2 and/or the secondary battery 18 with the power from the external power supply or the power resulting from the power generation by the fuel cell 54.

The adapter control section 59 has a CPU comprising integrated circuits and the like such as ROM, RAM, IC (Integrated Circuit) chips, and LSI (Large-Scale Integrated Circuit) chips. The ROM stores a control program and the like, for example. The RAM records the control program and the like loaded from the ROM. The adapter control section 59 uses the RAM to record control signals, detection signals, and the like output from the sections. The CPU provides control corresponding to the signals based on the control program stored in the ROM and outputs results as control signals to the sections. That is to say, the adapter control section 59 controls the power supply adapter 3 in accordance with detection signals and the like transmitted from the sections and the control program and the like stored in the ROM.

The fuel cell 54 is detachable on the power supply adapter 3 according to the above-mentioned configuration. When the fuel cell 54 deteriorates and becomes incapable of power generation, the fuel cell 54 is replaceable as consumable supplies. The fuel cartridge 66a is also detachably attached to the fuel cell 54 of the power supply adapter 3. When the filled fuel is completely used up, for example, the fuel cartridge 66a is replaceable as consumable supplies. In addition to the above-mentioned configuration, the power supply adapter 3 has a backup power supply (not shown) and the like such as a coin cell, button cell, and the like for driving the pressure members 73a and 73b, and the like when no power is supplied or the fuel cell 54 does not generate power.

There has been described the example case where the fuel cell 54 of the power supply adapter 3 has the fuel reforming section 82 when the fuel cartridge 66a requires this section. The present invention is not limited to such configuration. For example, the fuel reforming section 82 may be provided for an adapter body (not shown) and the like where the voltage detection sections 55, 56, and 57, the selection switch 58, and the adapter control section 59 are installed. In this case, the fuel cartridge 66a is attached to the adapter body. The adapter body supplies reformed hydrogen gas and the like to the fuel cell 54 of the power supply adapter 3.

Figure 6:
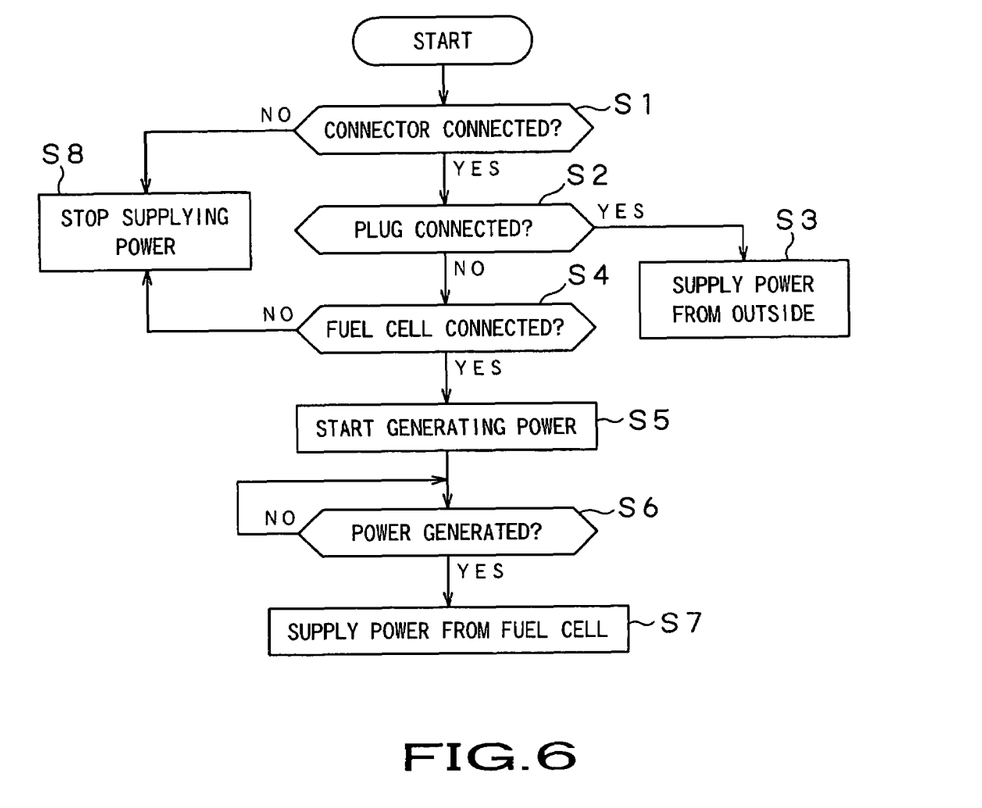
FIG. 6 is a flowchart that describes power supply operations of the power supply system.

With reference to a flowchart in FIG. 6, the following describes a power supply operation of the power supply system 1 having the above-mentioned configuration for the electronic device 2 and/or the secondary battery 18. This operation is performed according to computational processes by the CPU and the like based on the control program and the like stored in the storage means such as the ROM and the like of the adapter control section 59.

Let us consider that a user connects the connector 53 of the power supply adapter 3 to the connector 19 of the electronic device 2. At step S1, the adapter control section 59 determines whether or not the second voltage detection section 56 supplies a detection signal corresponding to a voltage value for a direct current flowing through the connector 53 and whether or not the connector 53 is connected to the connector 19 of the electronic device 2. Specifically, when the second voltage detection section 56 detects a voltage value of the direct current flowing through the connector 53, it is assumed that the voltage value is greater than or equal to a specified threshold value. In this case, the adapter control section 59 determines that the connector 53 is connected to the connector 19 of the electronic device 2. The process proceeds to step S2. When the second voltage detection section 56 detects a voltage value of the direct current flowing through the connector 53, it is assumed that the voltage value is smaller than or equal to the specified threshold value. In this case, the adapter control section 59 determines that the connector 53 is not properly connected to the connector 19 of the electronic device 2. The process proceeds to step S8. The system stops supplying the power to the electronic device 2 and/or the secondary battery 18.

At step S2, the adapter control section 59 determines whether or not the first voltage detection section 55 inputs a detection signal corresponding to the voltage value for the direct current converted by the AC/DC conversion section 52 and whether or not the power supply plug 51 is connected to the power receptacle. Specifically, when the first voltage detection section 55 detects a voltage value of the direct current converted by the AC/DC conversion section 52, it is assumed that the voltage value is greater than or equal to a specified threshold value. In this case, the adapter control section 59 determines that the power supply plug 51 is connected to the power receptacle. The process proceeds to step S3. When the first voltage detection section 55 detects a voltage value of the direct current converted by the AC/DC conversion section 52, it is assumed that the voltage value is smaller than or equal to the specified threshold value. In this case, the adapter control section 59 determines that the power supply plug 51 is not connected to the power receptacle. The process proceeds to step S4.

Let us assume that the adapter control section 59 determines that the power supply plug 51 is connected to the power receptacle. In this case, at step S3, the adapter control section 59 outputs a control signal to the selection switch 58. The control signal is used to electrically connect the external power supply with the electronic device 2. The selection switch 58 is operated to supply the power from the external power supply to the electronic device 2. In this manner, the power supply adapter 3 determines that the power supply plug 51 is connected to the external power supply and the power can be supplied from the external power supply. In this case, the adapter control section 59 controls the selection switch 58 so that the external power supply and the electronic device 2 can be electrically connected. The power from the external power supply is supplied to the electronic device 2 and/or the secondary battery 18.

Let us assume that the adapter control section 59 determines that the power supply plug 51 is not connected to the power receptacle. In this case, at step S4, the adapter control section 59 determines whether or not the third voltage detection section 57 inputs a detection signal corresponding to a voltage value of the fuel cell 54 and whether or not the fuel cell 54 is connected to the power supply adapter 3. Specifically, there is a case where a voltage value for the fuel cell 54 is detected by the third voltage detection section 57 and is greater than or equal to a specified threshold value. In this case, the adapter control section 59 determines that the fuel cell 54 is connected to the power supply adapter 3. The process proceeds to step S5. There is another case where a voltage value for the fuel cell 54 is detected by the third voltage detection section 57 and is smaller than or equal to a specified threshold value. In this case, the adapter control section 59 determines that the fuel cell 54 is not properly connected to the power supply adapter 3. The process proceeds to step S8 to stop power supply.

Then, the adapter control section 59 may determine that the fuel cell 54 is appropriately connected to the power supply adapter 3. In this case, at step S5, the adapter control section 59 outputs a control signal to the pressure members 73*a* and 73*b* to generate power for the fuel cell 54. Specifically, the adapter control section 59 outputs the control signal to the pressure members 73*a* and 73*b* of the fuel cell 54. The pressure members 73*a* and 73*b* press the movable valves 71*a* and 71*b* in a direction opposite to the power applying direction of the force applying members 72*a* and 72*b* to open the attachment opening 66 and the inlet 67. The gas is supplied as fuel to the hydrogen electrode 63 and the oxygen electrode 64 through the attachment opening 66 and the inlet 67. An electrochemical reaction occurs between the hydrogen electrode 63 and the oxygen electrode 64 to start power generation.

At step S6, the adapter control section 59 determines whether or not the third voltage detection section 57 inputs a detection signal corresponding to the voltage value of the fuel cell 54 and the fuel cell 54 starts power generation. Specifically, there is a case where a voltage value for the fuel cell 54 is detected by the third voltage detection section 57 and is greater than or equal to a specified threshold value. In this case, the adapter control section 59 determines that the fuel cell 54 starts power generation. The process proceeds to step S7. There is another case where a voltage value for the fuel cell 54 is detected by the third voltage detection section 57 and is smaller than or equal to the specified threshold value. In this case, the adapter control section 59 determines that the fuel cell 54 does not start power generation. The adapter control section 59 repeats the operation at step S6.

The adapter control section 59 may determine that the fuel cell 54 starts power generation. In this case, at step S7, the adapter control section 59 outputs a control signal to the selection switch 58. The control signal is used to electrically connect the fuel cell 54 with the electronic device 2. The selection switch 58 is operated to supply the power generated by the fuel cell 54 to the electronic device 2. In this manner, the power supply adapter 3 determines that the power supply plug 51 is not connected to the external power supply and the power cannot be supplied from the external power supply. In this case, the adapter control section 59 controls the selection switch 58 so that the fuel cell 54 and the electronic device 2 can be electrically connected. The power generated by the fuel cell 54 is supplied to the electronic device 2 and/or the secondary battery 18.

As mentioned above, the power supply system 1 provides the fuel cell 54 for the power supply adapter 3. The power generated by the fuel cell 54 can be supplied to the electronic device 2 and/or the secondary battery 18. The electronic device 2 can be smaller and more lightweight than conventional electronic devices mounted with fuel cells. It is possible to prevent the electronic device 2 from malfunctioning due to heat generation resulting from the power generation by the fuel cell 54.

Since the power supply system 1 provides the fuel cell 54 for the power supply adapter 3, power generated from the fuel cell 54 can drive the electronic device 2 and/or charge the secondary battery. This is useful when no power is supplied from an external power supply, namely, when there is unavailable any power receptacle that can supply power to electronic devices for outdoor use.

While there has been described supplying power to electronic devices such as notebook personal computers, cellular phones, camera-mounted VTRs, and PDAs, the present invention is not limited thereto. For example, the present invention can be applied to supplying power to a battery charger that only charges secondary batteries.

What is claimed is:

1. A power supply adapter to supply power to an electronic device and/or an internal battery of the electronic device, the power supply adapter comprising:

a portable housing capable of being hand carried by an individual having at least a connection for a fuel cell that provides a DC voltage output based on an electrochemical reaction;

an AC/DC converter contained within the portable housing providing a DC voltage based on conversion of an AC voltage;

the portable housing having an AC voltage input connection and a DC voltage output;

a control circuit contained within the portable housing for providing selection control signals based at least in part upon inputs from first, second, and third detection circuits so that the electronic device and/or the internal battery is selectively supplied with either the DC voltage generated by the fuel cell or the DC voltage provided by the AC/DC converter; and a switching circuit contained within the portable housing which receives the DC voltage from the fuel cell and the AC/DC converter directly or indirectly, and which under the control of the control circuit operates, such that in a first state, the switching circuit provides the DC voltage from the AC/DC converter as an output and disconnects the fuel cell, and in a second state, provides the DC voltage output from the fuel cell as an output, wherein the control circuit provides control to drive the fuel cell and supply power generated by the fuel cell to the electronic device and/or the internal battery of the electronic device when power supplied from the AC/DC converter is unavailable and only when it is determined that the power supply adapter is currently connected to the electronic device and/or an internal battery of the electronic device; and wherein said first detection circuit detects a voltage from the AC/DC converter and provides a corresponding first detection signal to the control circuit, the second detection circuit determines whether the electronic device is connected and provides a corresponding second detection signal to the control circuit, and the third voltage detection circuit detects a voltage on the output of the fuel cell and provides a corresponding third detection signal to the control circuit.

2. The power supply adapter according to claim 1, wherein the fuel cell has a power generation element comprising a layer of a hydrogen electrode and an oxygen electrode and an electrochemical reaction occurs between the hydrogen electrode and the oxygen electrode to generate power to be supplied to the electronic device and/or the secondary battery.

3. The power supply adapter according to claim 1, wherein the fuel cell has reforming means for reforming fuel when generating power.

4. The power supply adapter according to claim 1, wherein said fuel cell further contains at least two pressure adjustment members, each positioned at an inlet portion of the fuel cell, for controlling the flow rate of a fuel through the fuel cell, and wherein said control circuit controls the operation of said pressure members to adjust the flow rate of fuel through the fuel cell.

5. The power supply adapter according to claim 1, wherein each of said detection circuits includes an analog to digital conversion circuit and each of said first, second, and third detection signals is a digital signal.

6. The power supply adapter according to claim 1, wherein said control circuit controls the switching circuit so as to prevent the switching circuit from driving the output of the power supply adapter with either one of said external power supply or said fuel cell when said second voltage detection circuit detects that the electronic device is not connected to the power supply.

7. A power supply system comprising:
a portable housing capable of being hand carried by an individual having at least a connection for a fuel cell that provides a DC voltage output based on an electrochemical reaction;
an AC/DC converter contained within the portable housing providing a DC voltage based on conversion of an AC voltage;
the portable housing having an AC voltage input connection and a DC voltage output provided on a connection for
an electronic device and/or an internal battery of an electronic device; and
a control circuit for providing selection control based at least in part upon inputs from first, second, and third detection circuits so that the electronic device and/or the internal battery is supplied with either the DC voltage generated by the fuel cell or the DC voltage provided by the AC/DC converter; and
a switching circuit which under the control of the control circuit provides as an output either the DC voltage from the fuel cell or the DC voltage from the AC/DC converter, and wherein the control circuit provides control to drive the fuel cell and supply power generated by the fuel cell to the electronic device and/or the internal battery of the electronic device when power supplied from the external power supply becomes insufficient or unavailable and only when it is determined that the power supply adapter is currently connected to the electronic device and/or an internal battery of the electronic device; and wherein said the first voltage detection circuit detects a voltage from the external supply and provides a corresponding first detection signal to the control circuit, the second voltage detection circuit detects a voltage which determines whether the electronic device is connected and provides a corresponding second detection signal to the control circuit, and the third voltage detection circuit detects a voltage on the output of the fuel cell and provides a corresponding third detection signal to the control circuit.

8. The power supply system according to claim 7, wherein the fuel cell has a power generation element comprising a layer of a hydrogen electrode and an oxygen electrode and an electrochemical reaction occurs between the hydrogen electrode and the oxygen electrode to generate power to be supplied to the electronic device and/or the secondary battery.

9. The power supply system according to claim 7, wherein the power supply adapter has a production outlet for exhausting a reaction product generated by the electrochemical reaction.

10. The power supply system according to claim 7, wherein the power supply adapter has reforming means for reforming fuel to be supplied to the fuel cell.

11. The power supply system according to claim 7, wherein said fuel cell further contains at least two pressure adjustment members, each positioned at an inlet portion of the fuel cell, for controlling the flow rate of a fuel through the fuel cell, and wherein said control circuit controls the operation of said pressure members to adjust the flow rate of fuel through the fuel cell.

12. The power supply system according to claim 7, wherein each of said detection circuits includes an analog to digital conversion circuit and each of said first, second, and third detection signals is a digital signal.

13. The power supply system according to claim 7, wherein said control circuit controls the switching circuit so as to prevent the switching circuit from driving the output of the power supply adapter with either one of said external power supply or said fuel cell when said second voltage detection circuit detects that the electronic device is not connected to the power supply.

* * * * *